(12) United States Patent
Mandy et al.

(10) Patent No.: US 8,558,407 B2
(45) Date of Patent: Oct. 15, 2013

(54) ELEVATOR EMERGENCY LED LIGHTING POWER SUPPLY ASSEMBLY

(75) Inventors: Terry Roy Mandy, Paradise Valley, AZ (US); Dalton John Mandy, Scottsdale, AZ (US); Brandon Roy Mandy, Scottsdale, AZ (US)

(73) Assignee: MAN-D-TEC, Inc., Scottsdale, AZ (US)

( * ) Notice: Subject to any disclaimer, the term of this patent is extended or adjusted under 35 U.S.C. 154(b) by 213 days.

(21) Appl. No.: 13/013,382

(22) Filed: Jan. 25, 2011

(65) Prior Publication Data
US 2012/0187852 A1    Jul. 26, 2012

(51) Int. Cl.
*H02J 7/00*    (2006.01)

(52) U.S. Cl.
USPC ............................................. 307/66; 315/86

(58) Field of Classification Search
USPC ............... 315/86, 129, 209 R, 224–226, 291; 307/64, 66; 340/693.1, 693.2
See application file for complete search history.

(56) References Cited

U.S. PATENT DOCUMENTS

| | | | |
|---|---|---|---|
| 3,294,977 | A | 12/1966 | Duncan |
| 3,808,499 | A | 4/1974 | Edwards |
| 4,013,993 | A | 3/1977 | Mandel et al. |
| 4,056,757 | A | 11/1977 | Mauch et al. |
| 4,316,097 | A * | 2/1982 | Reynolds ........................ 307/66 |
| 4,708,223 | A | 11/1987 | Orndorff et al. |
| 4,890,200 | A | 12/1989 | Mandy |
| 5,003,432 | A | 3/1991 | Mandy |
| 5,661,645 | A | 8/1997 | Hochstein |
| 5,739,639 | A | 4/1998 | Johnson |
| 5,966,069 | A | 10/1999 | Zmurk et al. |
| 6,609,804 | B2 | 8/2003 | Nolan et al. |
| 6,860,628 | B2 | 3/2005 | Robertson et al. |
| 7,071,625 | B2 | 7/2006 | Cheng et al. |
| 7,114,830 | B2 | 10/2006 | Robertson et al. |
| 7,486,033 | B2 | 2/2009 | Chen et al. |
| 8,092,035 | B2 * | 1/2012 | Mandy et al. ................. 362/147 |
| 8,096,672 | B2 * | 1/2012 | Mandy et al. ................. 362/147 |
| 2008/0024010 | A1 | 1/2008 | Romano |
| 2008/0258628 | A1 | 10/2008 | Higley et al. |
| 2008/0296975 | A1 * | 12/2008 | Shakespeare et al. .......... 307/66 |
| 2011/0284330 | A1 * | 11/2011 | Massameno ................. 187/391 |

* cited by examiner

*Primary Examiner* — Thuy Vinh Tran

(74) *Attorney, Agent, or Firm* — Reising Ethington P.C.

(57) ABSTRACT

An elevator emergency LED lighting power supply assembly including an inverter that receives DC power from a battery and outputs backup power to LED lamps of an elevator lighting system. An LED driver is connected to the inverter, is connectable to an LED lamp of the elevator lighting system, receives AC power from the inverter, and outputs DC power sufficient to power an LED lamp. A relay is connected between the inverter and the LED driver, is connectable to a primary elevator electrical power supply, and allows AC power to flow from a primary elevator electrical power supply to elevator lighting system LEDs through the LED driver as long as AC power is available from a primary elevator electrical power supply. Upon loss of power from the primary elevator power supply the relay switches contacts and provides to the LED driver AC power received from the inverter.

16 Claims, 2 Drawing Sheets

ELEVATOR EMERGENCY LED LIGHTING POWER SUPPLY ASSEMBLY

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to an elevator emergency LED lighting power supply assembly for providing backup power to one or more LED lamps of an elevator interior illumination system.

2. Description of the Related Art Including Information Disclosed Under 37 CFR 1.97 and 1.98

Emergency elevator lighting systems are known in the art. For example, U.S. Pat. No. 4,056,757 issued Nov. 1, 1997 to Mauch, discloses an elevator emergency lighting power supply assembly including a battery connected to lamps normally used for interior illumination of an elevator cab and an inverter connected between the battery and the lamps to provide AC power to the lamps. However, an elevator emergency lighting power supply assembly constructed according to the Mauch patent would be unable to power LEDs and would likewise be unable to power LED drivers or any other circuit elements arranged to rectify AC power output from the inverter.

It's also known to use light emitting diodes (LEDs) for display indicators as well as for area illumination in elevators, and for LED drivers to be used in conditioning power to be supplied to LEDs. Because LEDs need controlled current flowing to them, LED drivers are typically configured to rectify AC power received from primary AC power supply grids, into DC power of suitable voltage and current. LED drivers may also be configured to automatically ramp up their voltage output when additional LEDs are connected, while holding current output constant.

BRIEF SUMMARY OF THE DISCLOSURE

An elevator emergency LED lighting power supply assembly is provided for providing backup power to one or more LED lamps of an elevator interior illumination system. The assembly may include a battery and an inverter connected to and configured to receive DC power from the battery and to output AC backup power to an elevator lighting system. The assembly may also include an LED driver that's connected to the inverter, is connectable to an LED lamp of the elevator lighting system, and that's configured to receive AC power from the inverter and to output DC power sufficient to power an LED lamp. The assembly may further include a relay that's connected between the inverter and the LED driver, that's connectable to the primary elevator electrical power supply, that's configured to allow AC power to flow from a primary elevator electrical power supply to elevator lighting system LEDs through the LED driver as long as AC power is available from a primary elevator electrical power supply, and that's further configured to, upon loss of power from a primary elevator power supply, switch contacts and provide to the LED driver AC power received from the inverter.

An elevator emergency LED lighting power supply assembly constructed according to the invention thus allows the LEDs of an elevator interior illumination system to be powered through the LED driver of the assembly from either a primary elevator electrical power supply or from the batteries of the assembly. The use of a single LED driver to condition both emergency and primary power also provides more closely controlled and consistent current output to the LED lamps despite switching between primary and backup power sources.

The LED driver may be configured to automatically ramp up its voltage output while holding current output constant so that it can power a variable number of LEDs.

The battery may be configured to output 12 VDC to the inverter and may comprise two 6 VDC batteries wired in series to provide a 12 VDC output. The inverter may be configured to output 120 VAC to the LED driver.

The LED driver may be configured to provide output in the range of approximately 3-12 VDC while holding current output constant so as to be able to automatically ramp its voltage sufficiently to power up to three 3-4 VDC elevator lighting system LEDs.

The relay may be configured to allow 120 VAC power to flow from a primary elevator electrical power supply to elevator lighting system LEDs through the LED driver as long as 120 VAC power is available from a primary elevator electrical power supply, and may be further configured to, upon loss of power from a primary elevator power supply, switch contacts and provide to the LED driver 120 VAC electrical power received from the inverter. The relay may also be configured to, upon restoration of power from the primary elevator power supply, switch contacts and provide to the LED driver 120 VAC power received from the primary elevator power supply.

A test switch may be connected between the relay and a primary elevator electrical power supply and configured to alternately cut and restore power that the relay receives from the primary elevator electrical power supply in response to manual actuation. This allows failure of the primary elevator electrical power supply to be simulated.

The assembly may include an alarm bell circuit comprising a 12 VDC power supply, and an alarm bell terminal block configured to connect an elevator code-compliant 6 VDC alarm bell into the alarm bell circuit, the alarm bell circuit being configured to provide 6 VDC at terminals of the alarm bell terminal block.

An inverter on/off switch may be connected to the inverter and configured to turn the inverter on and off in response to manual actuation. This allows for servicing without 120 VAC being present.

A light harness may be connected to the LED driver and may be connectable to LED lamps of an elevator interior illumination system to preclude the need for additional wiring to be installed between the LED driver and the LED.

A battery charger may be connected to the battery, may be connectable to a primary elevator power supply, and may be configured to receive AC power from a primary elevator power supply and to deliver DC power to the battery sufficient to charge the battery. The battery charger may be configured to charge the battery at a relatively high rate in response to battery discharge and to charge the battery at a relatively low rate generally less than or equal to a self-discharge rate of the battery when the battery is fully charged. This increases battery longevity by allowing for continuous exercise of the battery.

The assembly may include a first dimmer that may be connected to the LED driver via a second relay and configured to allow an operator to command the LED driver to adjust the current at which the LED driver operates when power is available from the primary elevator electrical power supply. The assembly may also include a second dimmer that may be connected to the LED driver via the second relay and configured to cause the LED driver to reduce the current at which the LED driver operates when powered by the battery. The second relay may be configured to couple the first dimmer to the LED driver as long as AC power is available from the primary elevator electrical power supply, and to switch contacts upon loss of power from the primary elevator power supply and couple the second dimmer to the LED driver.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which.

DETAILED DESCRIPTION OF INVENTION EMBODIMENT(S)

Figure 1:
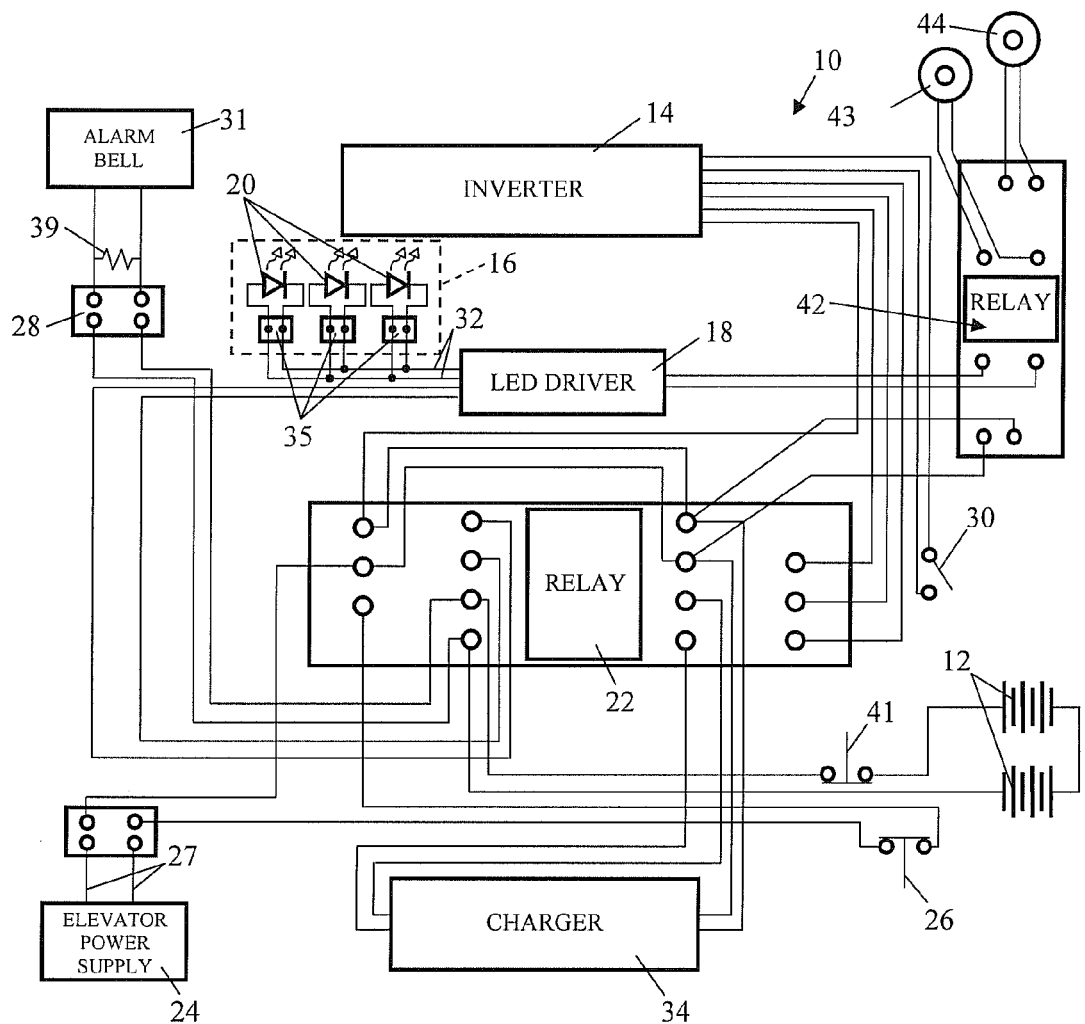
FIG. 1 is a schematic view of an elevator emergency LED lighting power supply assembly constructed according to the invention.
Figure 2:
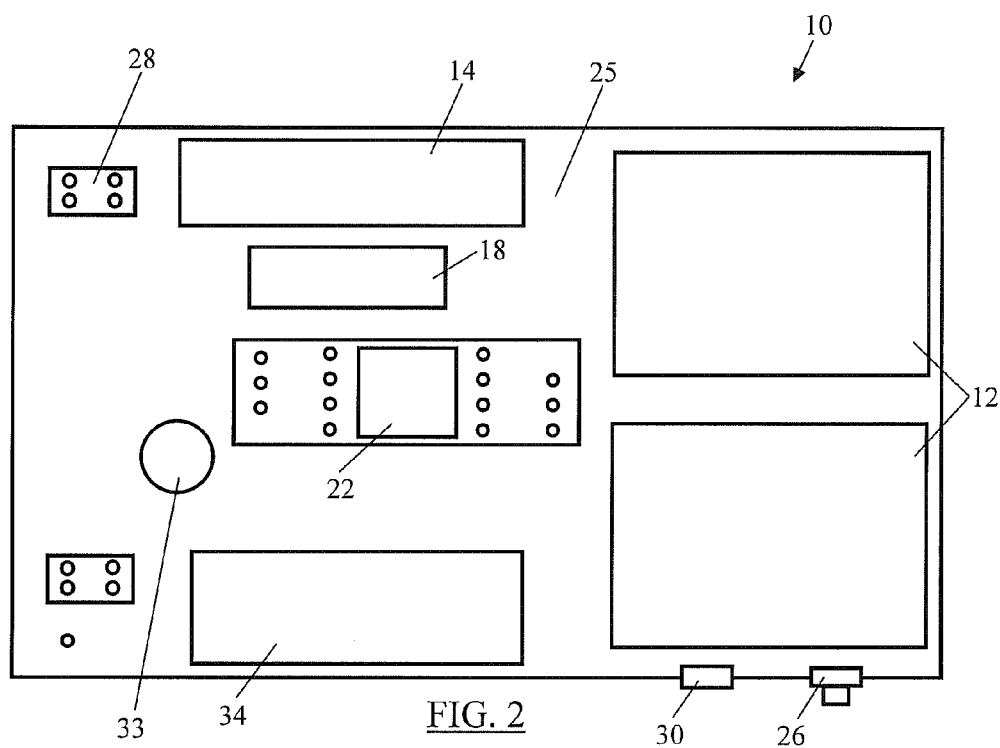
FIG. 2 is a top view of the elevator emergency LED lighting power supply assembly of FIG. 1 with a top panel of an assembly enclosure removed to expose internal components of the assembly.
Figure 3:
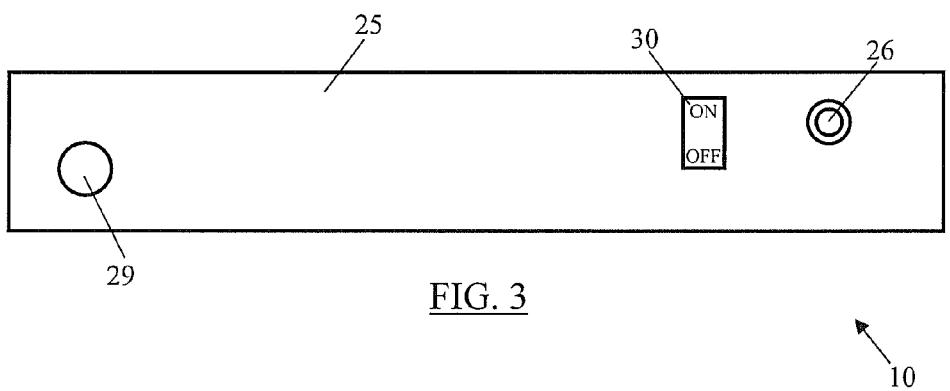
FIG. 3 is a front view of the elevator emergency LED lighting power supply assembly of FIG. 2.

An elevator emergency LED lighting power supply assembly for providing backup power to one or more LED lamps of an elevator interior illumination system is generally shown at 10 in FIGS. 1-3. The assembly 10 may include batteries 12 and an inverter 14 that's connected to and receives DC power from the batteries 12. The inverter 14 outputs AC backup power to an elevator interior illumination system 16. The assembly 10 may also include an LED driver 18 that's connected to the inverter 14 and may be connectable to one or more elevator lighting system LED lamps 20 that are normally used for interior illumination of an elevator cab. The LED driver 18 may receive AC power from the inverter 14 and output DC power sufficient to power the one or more elevator lighting system LED lamps 20. A relay 22 may be connected between the inverter 14 and the LED driver 18 and may also be connectable to a primary elevator electrical power supply 24 to allow AC power to flow from such a primary elevator electrical power supply 24 to elevator lighting system LEDs 20 through the LED driver 18 as long as AC power is available from a primary elevator electrical power supply 24.

Upon loss of power from a primary elevator electrical power supply 24 the relay 22 switches contacts and provides to the LED driver AC power received from the inverter 14. The LEDs 20 of an elevator lighting system 16 can thus be powered through the LED driver 18 from either a primary elevator electrical power supply 24 or from the batteries 12 of the elevator emergency LED lighting power supply assembly 10.

The assembly 10 may also include an enclosure 25 that may comprise any suitable metal or other material and may carry and/or enclose the batteries 12, the inverter 14, the LED driver 18, the relay 22, and other assembly components. AC power may be supplied to the assembly 10 from the primary elevator electrical power supply 24 via a power cord 27 that passes through an opening 29 in the enclosure 25.

The batteries 12 may be configured to output 12 VDC to the inverter 14 and the inverter 14 may, in turn, be configured to output 120 VAC to the LED driver 18. The batteries 12 may comprise two 6 VDC batteries 12 of any suitable type such as, for example, a maintenance-free sealed rechargeable lead-acid type that may have a capacity of 5 A, and that may be wired in series to provide a 12 VDC output. Rather than wire two 6 VDC batteries in series, a single 12 VDC battery may be used.

The LED driver 18 may be configured to automatically ramp up its voltage output while holding current output constant, and may thus be used to power a variable number of LEDs. The LED driver 18 may include a class 2 power supply having a variable input voltage of from 100-240 VAC and a secondary output of 3-21 VDC and having a power output capability of up to 9 watts. In other embodiments the power supply may have a power output of more than 9 watts. The LED driver 18 may be of any suitable type such as, for example, one that may be configured to accept an input voltage in the range of approximately 100-240 VAC and to provide output voltage in the range of approximately 3-21 VDC, while holding current output constant at, for example, 700 milliamps. The LED driver 18 may thus be of a type capable of automatically ramping-up its voltage sufficiently to power up to three 3-4 VDC elevator lighting system LEDs, so as to be able to connect to and power either three 3-4 VDC LEDs 20 in a single light fixture or three 3-4 VDC LEDs 20 in three separate light fixtures.

The relay 22 may be a 4 pole, double throw relay and may be configured and connected in such a way as to allow 120 VAC power to flow from a primary elevator electrical power supply 24 to elevator lighting system LEDs 20 through the LED driver 18 only as long as 120 VAC power is available from such a primary elevator electrical power supply 24. The relay 22 may be further configured and connected in such a way as to switch contacts upon loss of power from a primary elevator power supply, and provide to the LED driver 120 VAC electrical power received from the inverter 14.

The assembly 10 may include a primary dimmer 43 that may be connected to the LED driver 18 via a second relay 42 and configured to allow an operator to adjust light output by allowing the operator to command the LED driver 18 to adjust the current at which the LED driver 18 operates, i.e., the current that the LED driver 18 provides to elevator lighting system LEDs 20, when power is available from the primary elevator electrical power supply 24. The assembly 10 may also include an emergency light dimmer 44 that may be connected to the LED driver 18 via the second relay 42 and configured to automatically reduce the current at which the LED driver 18 operates when powered by the batteries 12. The second relay 42 may be configured to couple the primary dimmer 43 to the LED driver 18 as long as AC power is available from the primary elevator electrical power supply 24, and to switch contacts upon loss of power from the primary elevator power supply 24 and couple the emergency light dimmer 44 to the LED driver 18 as the first relay 22 couples the batteries 12 to the inverter 14 so that the inverter 14 powers the LED driver 18. This allows elevator code run-time requirements to be met while using a smaller battery or batteries than would otherwise be required.

The relay 22 may also be configured to, upon restoration of power from the primary elevator electrical power supply 24, switch contacts and provide to the LED driver 120 VAC power received from the primary elevator electrical power supply 24. The relay 22 may be of any suitable type to include an electromagnetic device or a solid state device such as a thyristor or an optocoupler.

A test switch 26 may be carried by the enclosure 25 as shown in FIGS. 2 and 3 and connected between the relay 22 and a primary elevator electrical power supply 24 as shown in FIG. 1. The test switch 26 may be configured and connected in such a way as to respond to manual actuation by cutting power that the relay 22 receives from the primary elevator electrical power supply 24 and then restoring power when the test switch 26 is released. An operator may thus simulate failure of the primary elevator electrical power supply 24 by manually actuating the test switch 26.

The assembly 10 may include a separate alarm bell terminal block or strip 28 comprising 6 VDC alarm bell terminals so that, by connecting an elevator code-compliant alarm bell 31 to the terminals of the alarm bell terminal strip 28, the alarm bell 31 can be connected into an alarm bell circuit 37 including the batteries 12 and an alarm bell push-button 41 (which may be supplied by end user) disposed in a position within the elevator car where an occupant can close the alarm bell circuit 37 and actuate the alarm bell 31 by pressing the alarm bell push-button 41. As shown in FIG. 1, the alarm bell circuit 37 may include a voltage-dropping resistor 39 connected in a suitable location, such as across the terminals of the alarm bell terminal strip 28, and being of suitable value to provide a voltage of approximately 6 VDC across the terminals of the alarm bell terminal strip 28. The alarm bell circuit 37 is configured and connected in such a way as to provide 6 VDC to the alarm bell terminal strip 28 both when primary elevator electrical power is available and when primary elevator electrical power is not available and power is available only from the battery 12.

An inverter on/off switch 30 may be connected to the inverter 14 and carried by the enclosure 25. The inverter on/off switch 30 may be configured to turn the inverter 14 on and off in response to manual actuation. This allows maintenance personnel, before servicing the assembly 10, to remove 120 VAC from the assembly 10 by actuating the inverter on/off switch 30.

The inverter 14 may be configured to cut AC power output when the batteries' output voltage drops below a predetermined minimum value of, for example, 10.5 VDC, to protect the batteries 12 from deep discharge. The inverter 14 may be of a type that includes a first visual indicator, such as a green LED, that illuminates in response to the output of 120 VAC by the inverter 14, and that includes an inverter circuit that provides power to the green LED when 120 VAC is being provided by the inverter. The inverter 14 may also be of a type that includes a second visual indicator, such as a red LED, that will illuminate if a short circuit is detected by the inverter 14 during activation, or if a component fails in the inverter during activation. The inverter 14 may be of any suitable type or model known in the art and may have any desired power output capacity that will allow the inverter 14 to draw available battery power at a rate low enough to meet an elevator code requirement to provide at least four hours of illumination time. For example, the inverter 14 may be of a type that provides up to 150 Watts of modified sine wave power drawn from the 12 VDC available from the series-connected 6 VDC batteries 12.

A plug-in light harness 32 may be connected to the LED driver 18, may pass out of the enclosure 25 through an opening 33 in the enclosure, and may be connectable to LED lamps 20 of an elevator interior illumination system 16. The plug-in light harness 32 precludes the need for additional wiring to be installed between the LED driver 18 and the LED, and allows an installer to, instead, simply plug free ends of the harness 32 into corresponding connectors of one or more LED lamps 20 of an elevator interior illumination system 16. The LED driver 18 is used to output power to the LED lamps while the assembly 10 is receiving 120 VAC power from the primary elevator power supply 24. In the event of a primary power outage, the inverter 14 would continue to supply 120 VAC power to the LED driver 18. The plug-in light harness 32 may include Molex plug connectors at the respective free ends of the harness 32 to be compatible with LED light fixtures that have Molex plug connectors 35. The LED driver 18 may be configured to respond to a loss of primary elevator electrical power by holding current output constant while automatically ramping up its voltage output as necessary to power either three 3.5 VDC LEDs 20 in a single fixture or three 3.5 VDC LEDs 20 in three separate fixtures.

A battery charger 34 may be connected to the batteries 12, may be connectable to the primary elevator power supply 24, may be configured to receive 120 VAC power from a primary elevator power supply 24, and may be further configured to deliver DC power to the batteries 12 sufficient to charge the batteries 12. The battery charger 34 may be of any suitable type to include a dual-rate charger configured to charge the batteries 12 at a relatively high rate (e.g., 1.5 A) in response to battery discharge and to charge the batteries 12 at a relatively low rate generally less than or equal to a self-discharge rate of the batteries 12 when the batteries 12 are fully charged. The charger 34 may include a first visual indicator, such as a green LED, that illuminates when 120 VAC is being applied to the charger 34, and may include a second visual indicator, such as a red LED, that illuminates when the batteries 12 are under charge and then turns off when the batteries 12 are fully charged.

This description, rather than describing limitations of an invention, only illustrates an embodiment of the invention recited in the claims. The language of this description is therefore exclusively descriptive and is non-limiting.

Obviously, it's possible to modify this invention from what the description teaches. Within the scope of the claims, one may practice the invention other than as described above.

What is claimed is:

1. An elevator emergency LED lighting power supply assembly for providing backup power to one or more LED lamps of an elevator interior illumination system, the assembly comprising:
   a battery;
   an inverter connected to and configured to receive DC power from the battery and configured to output AC backup power to an elevator lighting system;
   an LED driver connected to the inverter, connectable to an LED lamp of the elevator lighting system, and configured to receive AC power from the inverter and to output DC power sufficient to power an LED lamp; and
   a first relay connected between the inverter and the LED driver, connectable to a primary elevator electrical power supply, configured to allow AC power to flow from a primary elevator electrical power supply to elevator lighting system LEDs through the LED driver as long as AC power is available from a primary elevator electrical power supply, and further configured to switch contacts upon loss of power from a primary elevator power supply so that the LED driver receives AC power from the inverter.

2. An elevator emergency LED lighting power supply assembly as defined in claim 1 in which the LED driver is configured to automatically ramp up its voltage output while holding current output constant.

3. An elevator emergency LED lighting power supply assembly as defined in claim 1 in which the battery is configured to output 12 VDC to the inverter and the inverter is configured to output 120 VAC to the LED driver.

4. An elevator emergency LED lighting power supply assembly as defined in claim 3 in which the battery comprises two 6 VDC batteries connected in series to provide a 12 VDC output.

5. An elevator emergency LED lighting power supply assembly as defined in claim 3 in which the LED driver is configured to provide output in the range of approximately 3-21 VDC while maintaining current output constant.

6. An elevator emergency LED lighting power supply assembly as defined in claim 3 in which the relay is configured to allow 120 VAC power to flow from a primary elevator electrical power supply to elevator lighting system LEDs through the LED driver as long as 120 VAC power is available from a primary elevator electrical power supply, and further configured to, upon loss of power from a primary elevator power supply, switch contacts and provide to the LED driver, 120 VAC electrical power received from the inverter.

7. An elevator emergency LED lighting power supply assembly as defined in claim 6 in which the relay is configured to, upon restoration of power from the primary elevator power supply, switch contacts and provide to the LED driver 120 VAC power received from the primary elevator power supply.

8. An elevator emergency LED lighting power supply assembly as defined in claim 1 in which a test switch connected between the relay and a primary elevator electrical power supply and configured to alternately cut and restore power that the relay receives from the primary elevator electrical power supply in response to manual actuation.

9. An elevator emergency LED lighting power supply assembly as defined in claim 1 further including:
an alarm bell circuit comprising a 12 VDC power supply; and
an alarm bell terminal block configured to connect an elevator code-compliant 6 VDC alarm bell into the alarm bell circuit, the alarm bell circuit being configured to provide 6 VDC at terminals of the alarm bell terminal block.

10. An elevator emergency LED lighting power supply assembly as defined in claim 1 in which an inverter on/off switch connected to the inverter and configured to turn the inverter on and off in response to manual actuation.

11. An elevator emergency LED lighting power supply assembly as defined in claim 1 in which a plug-in light harness is connected to the LED driver and is connectable to LED lamps of an elevator interior illumination system.

12. An elevator emergency LED lighting power supply assembly as defined in claim 1 in which a battery charger is connected to the battery, is connectable to the primary elevator power supply, and is configured to receive AC power from a primary elevator power supply and to deliver DC power to the battery sufficient to charge the battery.

13. An elevator emergency LED lighting power supply assembly as defined in claim 12 in which the battery charger is configured to charge the battery at a relatively high rate in response to battery discharge and to charge the battery at a relatively low rate generally less than or equal to a self-discharge rate of the battery when the battery is fully charged.

14. An elevator emergency LED lighting power supply assembly as defined in claim 1 and further including a first dimmer coupled to the LED driver and configured to allow an operator to command the LED driver to adjust the current at which the LED driver operates when power is available from the primary elevator electrical power supply.

15. An elevator emergency LED lighting power supply assembly as defined in claim 1 and further including a second dimmer coupled to the LED driver and configured to cause the LED driver to reduce the current at which the LED driver operates when powered by the battery.

16. An elevator emergency LED lighting power supply assembly as defined in claim 1 further including a first dimmer connected to the LED driver via a second relay and configured to allow an operator to command the LED driver to adjust the current at which the LED driver operates when power is available from the primary elevator electrical power supply; and a second dimmer connected to the LED driver via the second relay and configured to cause the LED driver to reduce the current at which the LED driver operates when powered by the battery; wherein the second relay is configured to couple the first dimmer to the LED driver as long as AC power is available from the primary elevator electrical power supply, and to switch contacts upon loss of power from the primary elevator power supply and couple the second dimmer to the LED driver.

* * * * *